United States Patent [19]

Bracke et al.

[11] 4,226,955
[45] Oct. 7, 1980

[54] POLYMERIZATION PROCESS

[75] Inventors: William J. I. Bracke, Hamme; Jacqueline Brandli, Brussels, both of Belgium

[73] Assignee: Labofina S.A., Brussels, Belgium

[21] Appl. No.: 925,756

[22] Filed: Jul. 18, 1978

Related U.S. Application Data

[63] Continuation of Ser. No. 676,807, Apr. 14, 1976, abandoned.

[51] Int. Cl.² ............................................. C08F 279/04
[52] U.S. Cl. ................................................... 525/316
[58] Field of Search .................... 260/880 R; 525/316

[56] References Cited

U.S. PATENT DOCUMENTS 3,855,355  12/1974  Moore ............................... 260/880 R

FOREIGN PATENT DOCUMENTS 1373089  11/1974  United Kingdom .

*Primary Examiner*—Paul R. Michl
*Attorney, Agent, or Firm*—Schwartz, Schwaab, Mack, Blumenthal & Koch

[57] ABSTRACT

Disclosed is a process for the production of ABS resins comprising the steps of (a) imbibing a stabilized latex of a rubbery polymer with styrene in an amount of about 1.5 and 15 parts by weight per 100 parts of dry latex and with acrylonitrile in an amount of about 5 to 15 parts by weight per 100 parts of dry latex; (b) introducing the imbibed latex into a polymerization vessel; (c) introducing into the polymerization vessel a mixture of styrene, acrylonitrile and a free radical initiator; (d) introducing a polymerization activator into the polymerization vessel; (e) polymerization the styrene and acrylonitrile in the polymerization vessel in the presence of the latex, whereby an ABS graft copolymer is produced; and (f) withdrawing the ABS polymer from the polymerization vessel.

9 Claims, No Drawings

POLYMERIZATION PROCESS

This is a continuation of Ser. No. 676,807, filed April 14, 1976, now abandoned.

BACKGROUND OF THE INVENTION

The invention relates to a process for production of graft copolymers and more specifically to a continuous process for the grafting of styrene and acrylonitrile monomers onto a rubbery polymeric latex to form an acrylonitrile-butadiene-styrene copolymer (ABS).

By polymerizing a mixture of styrene and acrylonitrile in the presence of, for example, a polybutadiene rubber, compositions are obtained which are comprised of said rubber and acrylonitrile-styrene copolymers, a part of these copolymers being grafted onto the rubber. ABS resins have good mechanical properties, particularly a high impact resistance, when the rubber has grafted thereon at least 10% of its own weight of the styrene-acrylonitrile copolymers, with the remainder of the copolymers forming a continuous phase wherein the particles of grafted rubber are dispersed.

The production of ABS resins by grafting a mixture of styrene and acrylonitrile monomers in the presence of a polybutadiene rubber is generally a batch-wise process. In recent years, however, many efforts have been devoted to the production of ABS by a continuous process.

According to one of these continuous processes, the rubbery latex is admixed with the monomers and the mixture is allowed to stand for a period of time which may reach several hours. The rubber particles absorb the monomers, and this period is called the imbibition period. Thereafter, the polymerization is carried out in two steps. The amount of monomer which is converted to polymer in the first step generally does not exceed 65% by weight of the total monomers employed. When the polymerization is carried out in one step, the properties of the ABS resin are poorer, especially the impact resistance and the melt flow index. See British Patent Specification No. 1,373,089.

According to a further continuous process, the latex is first imbibed with some or all of the styrene to be grafted, in the absence of acrylonitrile, and this mixture is then imbibed with acrylonitrile together with the balance, if any, of the styrene. Thereafter, graft polymerization of the monomers is initiated. The impact resistance of the thus-obtained ABS graft copolymer is higher in comparison to the impact resistance of a similar ABS resin prepared without the first imbibition by styrene in the absence of acrylonitrile. See U.S. Pat. No. 3,855,355.

These processes require at least three steps, and the production time for the ABS resins (imbibition+graft polymerization time) is very long where it is desired to obtain an optimum degree of grafting. Moreover, several separate reactors have to be connected in series, with careful control of the rates of introduction and of withdrawal. As a result, these processes require investment of large sums and are not very suitable for an efficient production of ABS resins on a commercial scale.

According to the prior art, the rubber particles must absorb monomers (styrene and acrylonitrile) before the polymerization step, the absorbed monomers being then polymerized within the swollen rubber particles. Without the imbibition step, the resulting ABS resins have poor properties. However, imbibition must be carried out cautiously, since absorption of too large an amount of monomers likewise results in ABS resins having poor properties.

In fact, the prior processes for manufacturing ABS resins comprise one or more steps to allow diffusion of styrene and/or acrylontriile into the rubber particles and then one or more polymerization steps wherein graft polymerization occurs within the swollen particles, always requiring at least three steps.

SUMMARY OF THE INVENTION

It is therefore an object of the present invention to provide an improved process for graft polymerization of styrene and acrylonitrile on rubber particles, preferably a continuous process comprising only one imbibition step and only one polymerization step.

Another object of the present invention is to provide a continuous process for manufacturing ABS resins with a high yield.

A further object of the present invention is to provide a continuous and flexible process for producing a wide variety of ABS resins.

In accomplishing the foregoing objects, there has been provided in accordance with the present invention a process for the production of ABS resins comprising the steps of (a) imbibing a stabilized latex of a rubbery polymer with styrene in an amount of about 1.5 and 15 parts by weight per 100 parts of dry latex and with acrylonitrile in an amount of about 5 to 15 parts by weight per 100 parts of dry latex; (b) introducing the imbibed latex into a polymerization vessel; (c) introducing into the polymerization vessel a mixture of styrene, acrylonitrile and a free radical initiator; (d) introducing a polymerization activator into the polymerization vessel; (e) polymerizing the styrene and acrylonitrile in the polymerization vessel in the presence of the latex, whereby an ABS graft copolymer is produced; and (f) withdrawing the ABS polymer from the polymerization vessel.

The total amount of styrene and acrylonitrile used preferably comprises between about 35 and 600 percent by weight of dry latex, and the ratio of styrene to acrylonitrile is preferably in the range of 4:1 to 1:1.

The rubbery latex may be a latex of a butadiene or isoprene homopolymer or a copolymer of butadiene or isoprene with a minor amount of a copolymerizable mono-olefinically unsaturated monomer, such as for instance styrene, alkylacrylate, acrylonitrile or other conventional monomers. This latex is typically prepared by polymerizing the monomer(s) in aqueous emulsion and in the presence of a catalyst, at a temperature varying between about 20° and 100° C. The emulsifier is most often an anionic emulsifier and more particularly an ammonium salt or an alkali metal salt of a fatty acid having from 8 to 20 carbon atoms, such as oleic acid, stearic acid, palmitic acid or disproportionated abietic acid. These rubber latex compositions as well as the foregoing and other methods for preparing them are well known in the prior art.

The average size of the rubber particles in the latex is preferably comprised between about 0.15 and 0.60 micron. ABS manufactured with rubber particles outside these limits has poor properties. A latex containing rubber particles having an average size in the range of about 0.15 to about 0.35 micron is generally preferred.

Other objects, features and advantages of the invention will become apparent from the detailed description of several preferred embodiments which follows.

DETAILED DESCRIPTION OF PREFERRED EMBODIMENTS

It has now been unexpectedly found that ABS resins with high impact resistance can be produced when the imbibition step and then the polymerization step are carried out under specific conditions.

Commercial latexes generally contain from 40 to 60% of dry matter and about 2 to 5% of emulsifier. Even when a latex containing small particles is used, the rate of dispersion of the monomers (styrene and acrylonitrile) may be too slow and the latex may partially coagulate in contact with the monomers. In order to avoid this drawback and to increase the diffusion rate of the monomers, it is convenient to add to the latex an emulsifier which is to act as a stabilizer. This emulsifier may be the same as the emulsifier already present in the latex, and it is added in an amount which is generally comprised between about 2 to 10 parts by weight per 100 parts of dry matter in the latex. It stands to reason that the quantity of added emulsifier depends upon the amount of emulsifier already present in the latex used, or in other words, upon the surface tension of the selected latex. With commercial latexes, the amount of emulsifier-stabilizer is generally in the range of 4 to 8 parts per 100 parts of dry matter in the latex.

It is also convenient to increase the stability of the latex by adding an electrolyte to the system, as is well known in the art. Suitable electrolytes include inorganic salts, such as trisodium polyphosphate, $CaCl_2$, NaCl, NaF, $K_2SO_4$ and $Na_2HPO_4$, and organic salts, such as sodium formiate and potassium tartrate. Selection of these or other known salts can be made based upon knowledge in the prior art, for example, the book "Emulsion Polymerization" by Blackley (Applied Science, 1975). The amount of salt does not generally exceed about 5 percent by weight of dry matter in the latex; however, once again, the surface tension of the latex is the determining factor.

The total amount of emulsifier in the stabilized latex and the amount of electrolyte (if any) are regulated in order to obtain a latex having a surface tension not lower than 30 dynes/cm and generally comprised between about 32 and 40 dynes/cm.

A part of the styrene and a part of the acrylonitrile to be grafted is admixed with the stabilized latex at a temperature which does not generally exceed about 75° C., in order to avoid any reaction between acrylonitrile and water in the basic medium. The temperature is therefore between about 10° and 75° C. and more particularly between about 20° and 60° C. Dispersion of the added monomers into the particles of stabilized rubbery latex occurs easily and without coagulation of the latex. The amount of styrene in this imbibing step is comprised between about 1.5 and 15 parts by weight (per 100 parts of dry latex) and more particularly between about 1.75 and 10 parts. On the other hand, the amount of acrylonitrile in this step may vary between about 5 and 15 parts and preferably between about 6 and 12 parts (per 100 parts of dry latex).

The imbibing time may be from about 1 to 20 hours, this time being generally shorter where large amount of monomers are used. This imbibing time must be regulated as a function of the temperature and of the amount of styrene and acrylonitrile admixed with the rubbery latex in the first step of the process. An excessive imbibing time leads to an unstable latex. However, when the latex is imbibed by a mixture of styrene and acrylonitrile monomers within the above mentioned amounts, the imbibing time is less critical than in other processes. This time depends on the imbibing temperatures and typically is between about 5 and 20 hours at a temperature of about 20° C. and is in the range of about 2 to 8 hours at a temperature of 40° C.

The mixture resulting from the imbibition of the rubbery latex by part of the styrene and part of the acrylonitrile to be grafted is introduced continuously into the reactor where the grafting reaction takes place. A molecular weight regulator or chain-transfer agent may be added, if desired, to this mixture in an amount which does not exceed about 1% by weight of monomers. Preferred modifiers are alkylmercaptans containing generally from 8 to 16 carbon atoms per molecule, or their mixtures, for instance a tertiary $C_{12}$ mercaptan. These are well known in the art.

The balance of styrene and acrylonitrile, together with apolymerization catalyst system, are also introduced continuously into the reactor. The mixture of imbibed rubbery latex and additional styrene-acrylonitrile is retained in the reactor under polymerization conditions, and the ABS resin is withdrawn continuously at a rate equal to the feed-rate into this reactor.

In the polymerization reactor, the respective amounts of total monomers and of rubbery polybutadiene may be varied between wide limits, depending upon the end use of the ABS resin. For some applications, the ABS resin is admixed with a SAN resin (styrene-acrylonitrile copolymer) and in that case the polybutadiene content of the ABS resin is relatively large and may be as high as 80% by weight. The process of the present invention is very flexible and the ABS resins prepared in accordance with this process may contain 35 to 600% of styrene+acrylonitrile, based on the weight of dry rubber, the ratio of styrene to acrylonitrile being generally in the range of about 4:1 to 1:1.

The amount of styrene and acrylonitrile monomers continuously introduced into the polymerization reactor, in addition to the imbibed rubbery latex, is adjusted according to the composition of the desired final ABS resin. However, the mixture of styrene and acrylonitrile added to the imbibed latex consists preferably of about 25% to 33% of acrylonitrile and 67% to 75% by weight of styrene. With such a ratio the resulting ABS resins have better properties, such as a better solvent resistance.

The grafting reaction is carried out at a temperature of between 50° and 75° C. in the presence of any known catalyst system and, more particularly, a catalyst system comprising a free radical initiator and an activator. These catalyst and activator systems are also well known in the art.

According to a preferred embodiment of the present invention, the free-radical initiator is introduced into the reactor in admixture with the monomers and the activator is introduced as a separate stream. Per-compounds, such as potassium persulfate, organic hydroperoxides, alkarylperoxides, or azobis-isobutyronitrile may be used to initiate polymerization of the monomers. The initiator is typically used in an amount from about 0.1 to 1% by weight, based on the total weight of monomers and rubber content of the latex.

The activator is introduced separately and is generally a compound of a multivalent metal which is present at its lower valence state, for instance ferrous sulfate. The activator may be used in admixture with a low amount of the sodium salt of formaldehydesulfoxylic acid or of any water-soluble reductant, for instance a reducing sugar (dextrose, glucose and the like) or other easily oxidizable polyhydroxy compound.

A chain transfer agent or molecular weight regulator is also introduced into the polymerization reactor in admixture with the added monomers. This agent is preferably an alkylmercaptan containing from 8 to 16 carbon atoms, such as for instance tert-dodecylmercaptan. The amount of mercaptan in admixture with the monomers which are introduced into the polymerization reactor does not generally exceed 1% by weight of monomers and typically varys between about 0.2 and 1% by weight of the monomers.

It has been found that, under the above described operating conditions, ABS resins are easily obtained with a yield typically exceeding 90% based on the amounts of rubber latex and monomers. The mixture of ABS and unconverted monomers is continuously withdrawn from the reactor, these monomers are recycled and the resin is worked in accordance with known processes, e.g., including coagulation of the resin, and drying.

The above described process is particularly well adapted for the manufacture of ABS resins having a high content (about 50 to 80% by weight) of polybutadiene. These ABS resins may then be blended with SAN resins to prepare ABS resins having a polybutadiene content varying between about 10 to 30% by weight, which resins are generally used for the production of molded products. Since SAN resins are not very expensive, ABS resins prepared by blending are therefore more advantageous than ABS resins having the same rubber content but which are obtained by emulsion polymerization. Conventional plasticizers are typically added to the blended compositions in an amount of from about 0.5 to 5% by weight.

Instead of styrene or in admixture with styrene, another vinyl-aromatic compound, such as an alpha-alkylstyrene or a halostyrene may be used, for example, alpha-methylstyrene, p-chlorostyrene and the like. Such materials are herein collectively referred to as "styrene". In the same manner, methacrylonitrile may be used instead of or in admixture with acrylonitrile, such materials being herein collectively referred to as "acrylonitrile". Furthermore, the rubbery latex most often used is a polymer of 1,4-diene, typically polybutadiene, polyisoprene or a mixture of these two elastomers. Other rubbery compositions or copolymers of butadiene and vinyl compounds, such as for example butadiene-styrene copolymers may be used. The latex is generally prepared by emulsion polymerization of the monomer (or monomers) in the presence of an anionic emulsifier.

The process of the present invention is based on the unexpected discovery that ABS resins which may have a high polybutadiene content can be made by a continuous process consisting in polymerizing styrene and acrylonitrile on a stabilized rubbery latex which has been previously imbibed by limited amounts of styrene and of acrylonitrile.

Comparative experiments have shown that:

1. ABS resins manufactured from a stabilized rubbery latex which has been previously imbibed by the whole amount of styrene and acrylonitrile monomers have less valuable properties;
2. ABS resins cannot be satisfactorily manufactured from a rubbery latex which has not been previously stabilized; and
3. ABS resins cannot be prepared where the stabilized latex is imbibed only by styrene without acrylonitrile.

Advantages of this invention are illustrated by the following examples which should not be construed to limit the invention.

EXAMPLE 1

A 7 l. reactor is first charged with a stabilized polybutadiene emulsion. The emulsion is prepared from polybutadiene latex FR-272 D (a product from Firestone Tire and Rubber, U.S.A.) having a content of dry matter of about 50% and containing rubber particles having an average size of 0.18 micron. The emulsion is stabilized by admixing this latex with an equal amount of aqueous solution containing the potassium salt of oleic acid and sodium tripolyphosphate. The amount of the potassium salt of oleic acid is 53.5 g. and the amount of sodium tripolyphosphate is 25 g. per kilogram of dry polybutadiene in the latex. The stabilized emulsion has a surface tension of 36 dynes/cm.

The reactor is provided with 4 lines, with an agitator and with heating means. One line is used to continuously introduce into the reactor 7.373 liters/hour of an imbibed stabilized rubbery latex. The stabilized rubbery latex has the same composition as the latex first introduced into the reactor. Imbibition is carried out by mixing 3.48 kg. of styrene, 8.72 kg. of acrylonitrile and 85.4 g. of tert.-dodecylmercaptan (or 0.7% by weight of styrene+acrylonitrile) per 100 kg. of dry rubber in the latex. The imbibition period is 17 hours at room temperature.

Another line is used to continuously introduce into the reactor 1.620 liters/hour of a mixture containing styrene and acrylonitrile (the weight ratio styrene:acrylonitrile being 67:33) together with tert.-dodecylmercaptan (0.8% by weight of monomers) and cumylhydroperoxide having a purity of 81.3% (0.36% of pure peroxide by weight of monomers).

A solution of activator is also continuously introduced by a third line into the reactor at a flow rate of 0.341 liter/hour. This solution is prepared by dissolving 0.5 g. of $FeSO_4.7H_2O$, 32 g. of sodium formaldehydesulfoxylate (or SFS) at 85% and 1 g. of a sodium salt of ethylenediamino tetracetic acid in 1 liter of water.

The mixture is stirred (100 rmp) and graft polymerization is carried out at 60° C. The ABS resin is withdrawn through the fourth line at a rate such that the reaction mixture remained substantially constant throughout the process and such that the residence time in the reactor is 45 minutes. The withdrawn emulsion of ABS resin is coagulated, washed and dried. The conversion based on dry weight content is 92.3% and the dry powder contains 6.9% acids (from soaps) and 93.1% ABS having a polybutadiene content of 54.6%.

This ABS resin is mixed with SAN resin, an alkylphenol as antioxidant and with a plasticizer. The blend has a polybutadiene content of 20%, a plasticizer content of 2% by weight and an antioxidant content of 0.2% by weight. A molded product is tested in accordance with the following methods: MFI (Melt Flow Index according to ASTM-D-1238; 200° C.-10 kg-Izod (Impact resistance on aged bar according to STM-D-256). Tensile strength at yield (ASTM-D-638).

The results are as follows:

MFI: 1.21 g./10 min.
Izod: 4.95 ft.lb./inch
Tensile Strength: 5.248 p.s.i.

By way of comparison, a further run is carried out with substantially the same concentration of reactants and under the same polymerization conditions as above described. In this comparative run, the stabilized latex is imbided only with styrene in the absence of acrylonitrile. The amount of acrylonitrile introduced in the reactor in admixture with styrene is consequently increased. The modifications are therefore as follows:

imbition of the stabilized latex with 3.48 kg of styrene and 22.4 g. of tert.-dodecylmercaptan per 100 kg. of dry rubber in the latex.

introduction into the reactor of 1.800 liters/hour of a mixture of styrene and acrylonitrile (the weight ratio of styrene to acrylonitrile being 60.8:39.2) together with tert.-dodecylmercaptan (0.78% by weight of monomers) and cumylhydroperoxide (.027% by weight of monomers).

It is found necessary to shut down the polymerization because the line used to withdraw the ABS resin is filled up and blocked with coagulated products within a relatively short time. This run shows that the rubbery latex is less stable during the graft polymerization when the latex is imbibed only with styrene and when the whole of the required acrylonitrile is introduced into the reactor during the polymerization.

EXAMPLE 2

The procedure of Example 1 is repeated, but with the use of a rubbery latex having an average particle size of 0.24 micron. The ABS resin is obtained with a yield of 92.8% by weight. The purified and dried ABS resin is blended with a SAN resin as described in Example 1. Molded products prepared from this blend have the following characteristics:
Izod (aged) : 5.94 ft.lb./inch
M.F.I. : 0.87 g./10 min.

Comparative runs are carried out to show the importance of the imbibition of the stabilized latex by some of the required styrene and acrylonitrile. In the first comparative run, the stabilized latex is imbibed with all of the styrene and all of the acrylonitrile which are required to obtain the desired ABS resin. The residence time in the polymerization reactor is 1 hour. The resin obtained is then blended with SAN resin and plasticizer in order to prepare a blend containing 20% polybutadiene and 2% plasticizer. This blend has the following characteristics:
Izod (aged) : 4.21 ft.lb./inch
M.F.I. : 1.25 g./10 min.

In the second run, the stabilized latex is not imbibed by any styrene and acrylonitrile and the whole of the required amount of these monomers is fed to the polymerization reactor as a separate stream. The resulting ABS is blended as above described and molded products prepared from the composition containing 20% polybutadiene and 2% of a plasticizer. The impact resistance (Izod; aged) of the product is 3.40 ft.lb./inch.

A third run is carried out as described in Example 2, but without stabilization of the rubbery latex. A swift coagulation of the latex occurs and the polymerization must be shut down.

By using the method of the present invention, the process can be operated continuously for a prolonged period of time without formation of coagulum in the polymerization reactor, even when ABS having a high polybutadiene content is manufactured.

EXAMPLE 3

A 7 l. reactor is charged with a stabilized polybutadiene emulsion. The polybutadiene emulsion has a content of dry matter of about 60% and the rubber particles have an average size of 0.24 micron. Stabilization of said emulsion is carried out by admixing the emulsion with the potassium salt of oleic acid (50.5 g. per kg of dry polybutadiene ) and with sodium tripolyphosphate (22 g. per kg of dry polybutadiene). The stabilized emulsion has a surface tension of 36 dynes/cm.

Into said reactor there is continuously introduced:
(a) 8.022 liters/hour of imbibed and stabilized rubbery latex. The stabilized latex has the same composition as the above latex. Imbibition is carried out by mixing 1.74 kg of styrene and 6.0 kg of acrylonitrile per 100 kg of dry rubber in the latex. The imbibition period is 3 hours at 40° C.
(b) 0.935 liters/hour of a mixture containing styrene and acrylonitrile (weight ratio styrene:acrylonitrile=67:33), together with tert.-dodecylmercaptan (0.8% by weight of monomers) and cumylhydroperoxide (0.32% by weight of monomers).
(c) 0.376 liters/hour of an aqueous solution prepared by dissolving 0.5 g of $FeSO_4.7H_2O$, 31.5 g. of SFS at 85% and 1 g. of a sodium salt of ethylenediaminotetra-acetic acid in 1 l. of water.

The mixture in the reactor is stirred (100 rpm) and graft polymerization carried out at 60° C. The residence time is 45 minutes. The withdrawn emulsion of ABS is coagulated, washed and dried. The polybutadiene content is 78.2%. This ABS resin is blended with SAN resin as described in Example 1. The blend has a tensile strength of 5.24 p.s.i.

As will be evident to those skilled in the art, various modifications of this method can be made without departing from the scope of this invention. For instance, the monomers may be introduced intermittently at short intervals instead of continuously. Moreover, the activator solution may be admixed with the stabilized latex, more particularly when this activator solution contains a reducing sugar, such as dextrose, as reductant.

What is claimed is:
1. A process for preparing an ABS graft copolymer comprising the steps of:
(a) imbibing a stabilized latex rubbery polymer having a surface tension of between about 30 and 40 dynes/cm with a portion of the styrene to be grafted with the latex in an amount of about 1.5 and 15 parts by weight styrene per 100 parts of dry latex and with a portion of the acrylonitrile to be grafted with the latex in an amount of about 5 to 15 parts by weight acrylonitrile per 100 parts of dry latex for a period between about 1 and 20 hours;
(b) introducing said imbibed latex into a polymerization vessel;
(c) introducing into said polymerization vessel the balance of styrene, and the balance of acrylonitrile and a free radical initiator;
(d) introducing a polymerization activator into said polymerization vessel;
(e) polymerizing said styrene and acrylonitrile in said polymerization vessel in the presence of said latex, whereby an ABS graft copolymer is produced; and
(f) withdrawing said ABS polymer from said polymerization vessel.

2. The process as defined by claim 1, wherein the total styrene and acrylonitrile amounts to between about 35 and 600% by weight of said dry latex.

3. The process as defined by claim 1, wherein the ratio of total styrene to acrylonitrile ranges between about 4:1 to 1:1.

4. The process as defined by claim 1, wherein from about 0.2 to 1% by weight of a molecular weight regulator based upon the styrene and acrylonitrile is added to said polymerization vessel in step (c).

5. The process as defined by claim 1, wherein said styrene and acrylonitrile in step (c) are in a ratio of from about 25 to 33% by weight acrylonitrile and from about 7% to 75% by weight styrene.

6. The process as defined by claim 1, wherein said stabilized latex is prepared by adding to an unstabilized latex from about 2 to 10 parts by weight per 100 parts by weight of dry latex of an emulsifier selected from the group consisting of ammonium salts and alkali metal salts of a fatty acid.

7. The process as defined by claim 1, wherein said polymerization step is conducted at a temperature of from about 10° and 75° C.

8. The process as defined by claim 1, wherein the latex is imbibed with from about 1.75 to 10 parts of styrene and with from about 6 to 12 parts of acrylonitrile.

9. The process as defined by claim 4, wherein said molecular weight regulator is an alkylmercaptan containing from 8 to 16 carbon atoms per molecule.

* * * * *